US010412460B2

(12) United States Patent
Huang et al.

(10) Patent No.: US 10,412,460 B2
(45) Date of Patent: Sep. 10, 2019

(54) HYBRID NETWORK SYSTEM, CHANNEL CONTENT PLAYBACK METHOD, AND HYBRID SET TOP BOX (71) Applicant: Huawei Technologies Co., Ltd., Shenzhen (CN)

(72) Inventors: Yongjing Huang, Nanjing (CN); Kun Liu, Nanjing (CN); Jilei Jia, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/038,667

(22) Filed: Jul. 18, 2018

(65) Prior Publication Data

US 2018/0324498 A1  Nov. 8, 2018

Related U.S. Application Data (63) Continuation of application No. 15/246,128, filed on Aug. 24, 2016, now Pat. No. 10,038,940, which is a
(Continued)

(30) Foreign Application Priority Data

May 27, 2014 (CN) .......................... 2014 1 0228808

(51) Int. Cl.
*H04N 21/482* (2011.01)
*H04N 21/6379* (2011.01)
(Continued)

(52) U.S. Cl.
CPC ..... *H04N 21/4821* (2013.01); *H04N 21/2187* (2013.01); *H04N 21/26283* (2013.01);
(Continued)

(58) Field of Classification Search
CPC ......... H04N 21/2187; H04N 21/26283; H04N 21/26616; H04N 21/4325; H04N 21/4622;
(Continued)

(56) References Cited

U.S. PATENT DOCUMENTS 6,973,667 B2  12/2005  Fritsch
8,875,172 B1 * 10/2014  Chang ................. H04N 21/235
725/109

(Continued)

FOREIGN PATENT DOCUMENTS

CN          1984233 A      6/2007
CN         101018311 A      8/2007
(Continued)

OTHER PUBLICATIONS

Machine Translation and Abstract of Chinese Publication No. CN101374210, Feb. 25, 2009, 12 pages.
(Continued)

*Primary Examiner* — Brian T Pendleton
*Assistant Examiner* — Alan H Luong
(74) *Attorney, Agent, or Firm* — Conley Rose, P.C.

(57) ABSTRACT

A channel content playback method based on a hybrid network system which may avoid idleness of a digital video broadcasting (DVB) network and a hybrid set top box that may implement the method. The method includes accessing, by the hybrid set top box, an electronic program guide (EPG) system, acquiring, from the EPG system, a channel list of channel content, receiving, based on channel selection performed by a user according to the channel list, target channel content through a DVB network channel, acquiring a first uniform resource locator (URL) from the EPG system according to a rewind operation of the user, and acquiring, according to the first URL, the rewound target channel
(Continued)

content from a content delivery network (CDN) system located in an Internet Protocol (IP) network.

7 Claims, 2 Drawing Sheets

Related U.S. Application Data continuation of application No. PCT/CN2014/091842, filed on Nov. 21, 2014.

(51) Int. Cl.
| | |
|---|---|
| H04N 21/2187 | (2011.01) |
| H04N 21/262 | (2011.01) |
| H04N 21/266 | (2011.01) |
| H04N 21/432 | (2011.01) |
| H04N 21/462 | (2011.01) |
| H04N 21/643 | (2011.01) |
| H04N 21/6587 | (2011.01) |
| H04N 21/61 | (2011.01) |
| H04N 21/84 | (2011.01) |
| H04N 21/858 | (2011.01) |

(52) U.S. Cl.
CPC ... *H04N 21/26616* (2013.01); *H04N 21/4325* (2013.01); *H04N 21/4622* (2013.01); *H04N 21/482* (2013.01); *H04N 21/6379* (2013.01); *H04N 21/64322* (2013.01); *H04N 21/6587* (2013.01); *H04N 21/6125* (2013.01); *H04N 21/84* (2013.01); *H04N 21/8586* (2013.01)

(58) Field of Classification Search
CPC ............. H04N 21/482; H04N 21/4821; H04N 21/6125; H04N 21/6379; H04N 21/64322; H04N 21/6587; H04N 21/84; H04N 21/8586
USPC ................................. 725/92–98, 109–110, 52
See application file for complete search history.

(56) References Cited

U.S. PATENT DOCUMENTS

| | | | |
|---|---|---|---|
| 2002/0049985 A1 | 4/2002 | Olshansky et al. | |
| 2002/0124262 A1 | 9/2002 | Basso et al. | |
| 2003/0221197 A1* | 11/2003 | Fries ................... | H04N 7/17318 725/117 |
| 2004/0226044 A1 | 11/2004 | Goode | |
| 2005/0053082 A1 | 3/2005 | Dillon | |
| 2005/0111838 A1* | 5/2005 | Arishima ................. | H04N 5/76 386/235 |
| 2009/0222576 A1 | 9/2009 | Elstermann et al. | |
| 2011/0116419 A1* | 5/2011 | Cholas ................ | H04L 65/1006 370/259 |
| 2012/0222065 A1 | 8/2012 | Prins et al. | |
| 2012/0324513 A1 | 12/2012 | Hwang et al. | |
| 2012/0331513 A1* | 12/2012 | Yamagishi ......... | H04N 21/2362 725/95 |
| 2014/0006951 A1 | 1/2014 | Hunter | |
| 2014/0020021 A1* | 1/2014 | Liu ..................... | H04N 21/4383 725/39 |
| 2014/0123160 A1* | 5/2014 | van Coppenolle ..... | H04L 67/30 725/5 |
| 2014/0337411 A1 | 11/2014 | Panje et al. | |
| 2017/0026714 A1* | 1/2017 | Conan .............. | H04N 21/23439 |

FOREIGN PATENT DOCUMENTS

| | | |
|---|---|---|
| CN | 101039329 A | 9/2007 |
| CN | 101064839 A | 10/2007 |
| CN | 101146213 A | 3/2008 |
| CN | 101242674 A | 8/2008 |
| CN | 101325685 A | 12/2008 |
| CN | 101374210 A | 2/2009 |
| CN | 101399965 A | 4/2009 |
| CN | 101459809 A | 6/2009 |
| CN | 101521798 A | 9/2009 |
| CN | 201813496 U | 4/2011 |
| CN | 102300119 A | 12/2011 |
| CN | 102413369 A | 4/2012 |
| CN | 202841404 U | 3/2013 |
| CN | 103139641 A | 6/2013 |
| CN | 103179447 A | 6/2013 |
| CN | 103733612 A | 4/2014 |
| CN | 103986945 A | 8/2014 |
| EP | 2547103 A1 | 1/2013 |
| WO | 2012129762 A1 | 10/2012 |

OTHER PUBLICATIONS

Machine Translation and Abstract of Chinese Publication No. CN102413369, Apr. 11, 2012, 16 pages.
Machine Translation and Abstract of Chinese Publication No. CN103139641, Jun. 5, 2013, 12 pages.
Machine Translation and Abstract of Chinese Publication No. CN103179447, Jun. 26, 2013, 16 pages.
Machine Translation and Abstract of Chinese Publication No. CN201813496, Apr. 27, 2011, 6 pages.
Machine Translation and Abstract of Chinese Publication No. CN1984233, Jun. 20, 2007, 12 pages.
Machine Translation and Abstract of Chinese Publication No. CN101039329, Sep. 19, 2007, 22 pages.
Machine Translation and Abstract of Chinese Publication No. CN101064839, Oct. 31, 2007, 10 pages.
Machine Translation and Abstract of Chinese Publication No. CN101146213, Part 1, Mar. 19, 2008, 8 pages.
Machine Translation and Abstract of Chinese Publication No. CN101146213, Part 2, Mar. 19, 2008, 20 pages.
Machine Translation and Abstract of Chinese Publication No. CN101242674, Part 1, Aug. 13, 2008, 11 pages.
Machine Translation and Abstract of Chinese Publication No. CN101242674, Part 2, Aug. 13, 2008, 4 pages.
Machine Translation and Abstract of Chinese Publication No. CN101325685, Dec. 17, 2008, 7 pages.
Machine Translation and Abstract of Chinese Publication No. CN101459809, Jun. 17, 2009, 11 pages.
Machine Translation and Abstract of Chinese Publication No. CN101521798, Sep. 2, 2009, 13 pages.
Machine Translation and Abstract of Chinese Publication No. CN103733612, Apr. 16, 2014, 12 pages.
Machine Translation and Abstract of Chinese Publication No. CN103986945, Aug. 13, 2014, 15 pages.
Machine Translation and Abstract of Chinese Publication No. CN202841404, Mar. 27, 2013, 5 pages.
Sung, M., et al., "A Rich Media Framework for Communication-Broadcasting Converged IPTV," XP11312692, IEEE transactions on consumer electronics, vol. 56, No. 2, May 2010, 8 pages.
DVB Organization, "Commercial Requirements for Hybrid Broadcast/ Broadband Services," XP17826255, DVB-CM IPTV Group, CM848, CM-IPTV0221r18, Oct. 13, 2006, 20 pages.
Next Generation Broadcast Television,"Final Report on ATSC 3.0," ATSC Planning Team 2, PT2-046r11, Sep. 21, 2011, 40 pages.
Foreign Communication From a Counterpart Application, European Application No. 14893291.6, Extended European Search Report dated Jan. 4, 2017, 9 pages.
Foreign Communication From a Counterpart Application, Chinese Application No. 201410228808.5, Chinese Office Action dated Sep. 18, 2016, 9 pages.
Foreign Communication From a Counterpart Application, Chinese Application No. 201410228808.5, Chinese Office Action dated Jan. 26, 2017, 11 pages.
Foreign Communication From a Counterpart Application, PCT Application No. PCT/CN2014/091842, English Translation of International Search Report dated Mar. 4, 2015, 2 pages.

(56) References Cited

OTHER PUBLICATIONS

Foreign Communication From a Counterpart Application, PCT Application No. PCT/CN2014/091842, English Translation of Written Opinion dated Mar. 4, 2015, 6 pages.

* cited by examiner

HYBRID NETWORK SYSTEM, CHANNEL CONTENT PLAYBACK METHOD, AND HYBRID SET TOP BOX

CROSS-REFERENCE TO RELATED APPLICATIONS

This application is a continuation of U.S. patent application Ser. No. 15/246,128 filed on Aug. 24, 2016, which is a continuation of International Patent Application No. PCT/CN2014/091842 filed on Nov. 21, 2014. The International Patent Application claims priority to Chinese Patent Application No. 201410228808.5 filed on May 27, 2014. All of the afore-mentioned patent applications are hereby incorporated by reference in their entireties.

TECHNICAL FIELD

The present disclosure relates to the communications field, and in particular, to a hybrid network system, a channel content playback method, and a hybrid set top box (STB).

BACKGROUND

A digital video broadcasting (DVB) service has been launched for many years, and related technologies thereof have been quite mature. A principle of the DVB service is that an operator sets up a DVB network, and provides a video live broadcast service for a user through the DVB network such that the user can watch at home live broadcast television programs around the world conveniently. However, with the development of science and technology and improvement of material living standard of human beings, a user has increasingly diversified requirements for video watching, and live broadcast television programs cannot meet a demand of the user any longer. In recent years, due to popularization of an Internet Protocol (IP) network and improvement of network bandwidth, a user can experience rich Internet services, which include a video service such as a web television. In addition, the user can conveniently perform operations on a video, such as pause, rewind, fast forward, and playback, which meets diversified requirements of the user when the user uses an Internet video service. Therefore, a conventional live broadcast service of a digital television is at a distinct disadvantage under the impact of the Internet.

To improve this situation, operators attempt to introduce some functions of the Internet video service into the digital television. For example, an operator may set up, based on an IP network, a web television platform to introduce a live stream in a DVB network into the IP network by means of headend transcoding, thereby transforming the DVB network into an IP network, and providing a media service for the digital television using a content delivery network (CDN) in the IP network. In this way, the digital television may provide a video service of the IP network for a user, where the video service includes a service such as live broadcast, fast forward, rewind, or playback.

However, at a present stage, operators of conventional broadcast and television deploy a large quantity of DVB networks, and a large quantity of DVB networks are idle if a DVB network is transformed into an IP network. Consequently, a serious waste of network resources is caused and transformation costs are high, which is hardly affordable for the operators of the conventional broadcast and television.

SUMMARY

Embodiments of the present disclosure provide a hybrid network system, and provide, based on the hybrid network system, a corresponding channel content playback method and a corresponding hybrid STB.

A first aspect of the embodiments of the present disclosure provides a hybrid network system, including a head end system configured to acquire channel content from a media source, perform encoding on the channel content, provide live broadcast of the channel content for a terminal through a DVB network, and send the channel content to a hybrid video system that is in an IP network. The hybrid video system configured to acquire the channel content from the head end system, perform editing on the channel content, generate a channel list of the channel content, and deliver the channel content to a CDN system. The CDN system is configured to acquire the channel content from the hybrid video system, allocate a uniform resource locator (URL) to the channel content, and report the URL to the hybrid video system, and further configured to provide on-demand broadcast of the channel content for a hybrid STB according to a request, sent by a user based on the URL, for performing rewinding or fast forwarding on the channel. An electronic program guide (EPG) system configured to acquire the channel list of the channel content and the URL of the channel content from the hybrid video system, and send the channel list and the URL of the channel content to the hybrid STB according to a request of the user, and the hybrid STB configured to acquire the channel list from the EPG system, and receive, based on a DVB network channel, the channel content from the head end system through a DVB interface according to channel selection performed by the user based on the channel list, and further configured to acquire the URL of the channel content from the EPG system, and acquire, based on an IP network, the channel content from the CDN through an IP interface according to the rewind or fast forward request, based on the URL, of the user.

A second aspect of the embodiments of the present disclosure provides a channel content playback method, including accessing an EPG system, and acquiring, from the EPG system, a channel list of channel content, receiving, through a DVB network channel and based on channel selection performed by a user according to the channel list, target channel content selected by the user, acquiring a first URL from the EPG system according to a rewind operation of the user, where the first URL is a URL of a corresponding content fragment to which the target channel content has been rewound, and acquiring, according to the first URL, the rewound target channel content from a CDN system located in an IP network.

Based on the second aspect of the embodiments of the present disclosure, in a first implementation manner of the second aspect of the embodiments of the present disclosure, the method further includes acquiring a second URL from the EPG system according to a fast forward operation of the user, where the second URL is a URL of a corresponding content fragment to which the target channel content has been fast forwarded, and acquiring, according to the second URL, the fast forwarded target channel content from the CDN system located in the IP network.

With reference to the first implementation manner of the second aspect of the embodiments of the present disclosure, in a second implementation manner of the second aspect of the embodiments of the present disclosure, the method further includes receiving the target channel content through the DVB network channel when a moment to which the target channel content has been fast forwarded reaches a live broadcast moment of the target channel content.

A third aspect of the embodiments of the present disclosure provides a hybrid STB, including an EPG interface configured to access an EPG system, and acquire, from the EPG system, a channel list of channel content, a DVB interface configured to receive, through a DVB network channel and based on channel selection performed by a user according to the channel list, target channel content selected by the user, where the EPG interface is further configured to acquire a first URL from the EPG system according to a rewind operation of the user, where the first URL is a URL of a corresponding content fragment to which the target channel content has been rewound, and an IP interface configured to acquire, according to the first URL, the rewound target channel content from a CDN system located in an IP network.

With reference to the third aspect of the embodiments of the present disclosure, in a first implementation manner of the third aspect of the embodiments of the present disclosure, the EPG interface is further configured to acquire a second URL from the EPG system according to a fast forward operation of the user, where the second URL is a URL of the corresponding content fragment to which the target channel content has been rewound, and the IP interface is further configured to acquire, according to the second URL, the fast forwarded target channel content from the CDN system located in the IP network.

With reference to the first implementation manner of the third aspect of the embodiments of the present disclosure, in a second implementation manner of the third aspect of the embodiments of the present disclosure, the DVB interface is further configured to receive the target channel content through the DVB network channel when a moment to which the target channel content has been fast forwarded reaches a live broadcast moment of the target channel content.

It can be seen from the foregoing technical solutions that, according to the embodiments of the present disclosure, a prior-art method for providing a video live broadcast service through a DVB network is improved, where an IP network is used based on the DVB network. A hybrid STB of a user supports both a DVB network and an IP network. Channel content for live broadcast may be acquired from a head end system through a DVB interface, and the fast forwarded or rewound channel content may also be acquired, based on the IP network, from a CDN through an IP interface. Using such method, the method provided in the present disclosure can implement live broadcast of the channel content through the DVB network, and can also implement a rewind operation through the IP network. Because in the embodiments of the present disclosure, improvement is made based on an existing DVB network, and the DVB network is used to provide a live broadcast service of channel content for a user, idleness of the DVB network is not caused such that an operator may use the DVB network to provide a live broadcast service for the user, and use an IP network to provide a service based on the IP network for the user. Therefore, network resources are saved, transformation costs are reduced, and requirements of the operator are met.

DESCRIPTION OF EMBODIMENTS

Embodiments of the present disclosure provide a hybrid network system, and provide, based on the hybrid network system, a corresponding channel content playback method and a corresponding hybrid STB, which are respectively described in the following.

Figure 1:
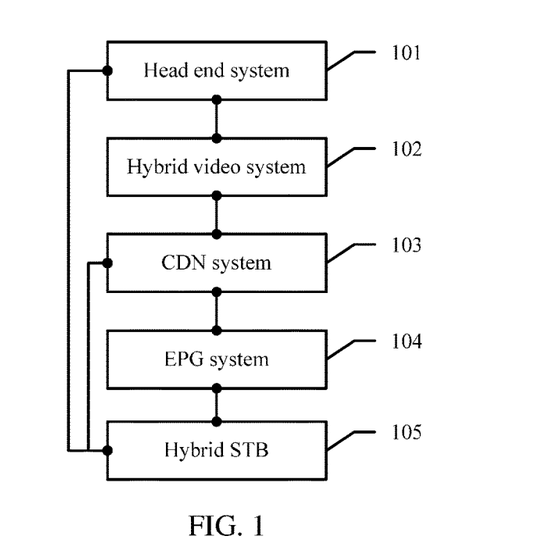
FIG. 1 is a structural diagram of an embodiment of a hybrid network system in an embodiment of the present disclosure.

For a basic structure of a hybrid network system provided in an embodiment of the present disclosure, refer to FIG. 1. The hybrid network system mainly includes a head end system 101 configured to acquire channel content from a media source, perform encoding on the channel content, provide live broadcast of the channel content for a terminal through a DVB network, and send the channel content to a hybrid video system 102 that is in an IP network. The hybrid video system 102 configured to acquire the channel content from the head end system 101, perform editing on the channel content, generate a channel list of the channel content, and deliver the channel content to a CDN system 103. The CDN system 103 configured to acquire the channel content from the hybrid video system 102, allocate a URL to the channel content, and report the URL to the hybrid video system 102, and further configured to provide on-demand broadcast of the channel content for a hybrid STB 105 according to a request, sent by a user based on the URL, for performing rewinding or fast forwarding on the channel, an EPG system 104 configured to acquire the channel list of the channel content and the URL of the channel content from the hybrid video system 102, and send the channel list and the URL of the channel content to the hybrid STB 105 according to a request of the user, and the hybrid STB 105 configured to acquire the channel list from the EPG system 104, and receive, based on a DVB network channel, the channel content from the head end system 101 through a DVB interface according to channel selection performed by the user based on the channel list, and further configured to acquire the URL of the channel content from the EPG system 104, and acquire, based on an IP network, the channel content from the CDN system 103 through an IP interface according to the rewind or fast forward request, based on the URL, of the user.

The hybrid network system provided in this embodiment implements a combination of a DVB network and an IP network. Based on an existing DVB network, the head end system 101 performs encoding on channel content, and sends the encoded channel content to the hybrid video system 102 that is in the IP network. The CDN system 103 in the IP network acquires, from the hybrid video system 102, the encoded channel content, allocates a URL to the encoded channel content, and reports the URL to the hybrid video system 102. The encoded channel content is saved in the CDN system 103 in a form of a content fragment, and the URL is used to locate a location of each content fragment.

The hybrid STB 105 acquires, through the DVB network and through the DVB interface, channel content for live broadcast when a user watches a live broadcast video. The EPG system 104 acquires, from the hybrid video system 102, a URL of a corresponding content fragment to which the channel content has been rewound or fast forwarded when the user performs a rewind or fast forward operation, and the hybrid STB 105 acquires, from the EPG system 104, the URL of the corresponding content fragment to which the channel content has been rewound or fast forwarded, and acquires corresponding channel content from the CDN system 103 according to the acquired URL.

In an order that switching can be successfully performed from a DVB network to an IP network, or switching back to a DVB network can be successfully performed from an IP network, a channel list of channel content in the DVB network keeps the same as a channel list of channel content in the IP network.

The DVB network includes a DVB-satellite (DVB-S) network, a DVB-terrestrial (DVB-T) network, or a DVB-cable (DVB-C) network, which is not limited in this embodiment. The IP network includes an IP dedicated network or an IP public network, which is not limited in this embodiment.

An operator may directly deploy an origin server without deploying an entire CDN system 103. The origin server is configured to complete a media distribution capability of the CDN system 103 by means of a caching mechanism of the Hypertext Transfer Protocol (HTTP).

This embodiment of the present disclosure provides a hybrid network system, including the head end system 101, the hybrid video system 102, the CDN system 103, the EPG system 104, and the hybrid STB 105. The head end system 101 performs encoding on channel content provided by a DVB network for live broadcast, and sends encoded channel content to the hybrid video system 102 such that the DVB network is used in combination with an IP network. The hybrid STB 105 acquires, through a DVB interface, the channel content for live broadcast from the head end system 101, and acquires, based on the IP network, the fast forwarded or rewound channel content from the CDN through an IP interface. Using such method, the method provided in the present disclosure can implement live broadcast of the channel content through the DVB network, and can also implement a rewind operation through the IP network. Because in this embodiment of the present disclosure, improvement is made based on an existing DVB network, and the DVB network is used to provide a live broadcast service of channel content for a user, idleness of the DVB network is not caused such that an operator may use the DVB network to provide a live broadcast service for the user, and use an IP network to provide a service based on the IP network for the user. Therefore, network resources are saved, transformation costs are reduced, and requirements of the operator are met.

Based on the hybrid network system shown in FIG. 1, an embodiment of the present disclosure further provides a channel content playback method. For a basic process of the method, refer to FIG. 2, and the method includes the following steps.

Figure 2:
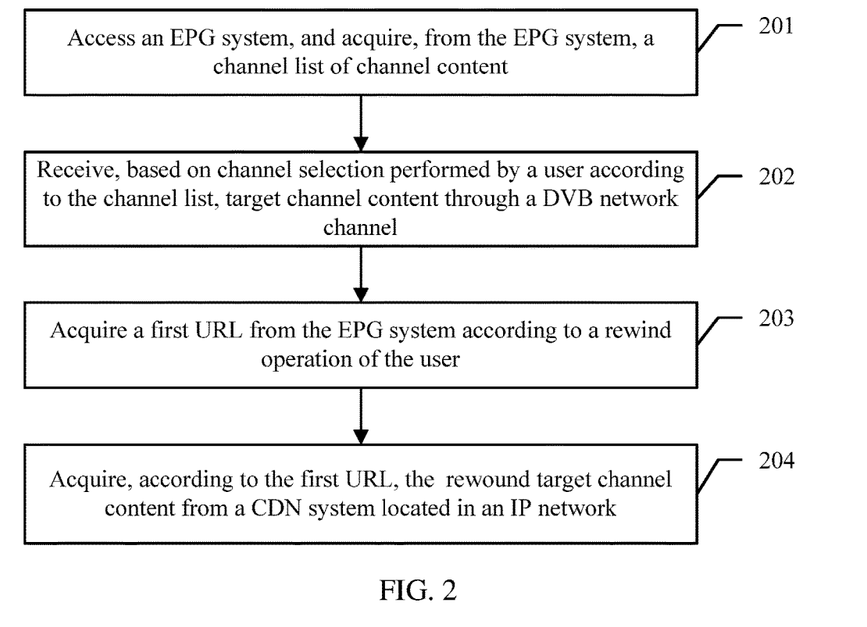
FIG. 2 is a flowchart of an embodiment of a channel content playback method in an embodiment of the present disclosure.

Step 201: Access an EPG system, and acquire, from the EPG system, a channel list of channel content.

The EPG system may provide presentation of the channel list. In this embodiment, a hybrid STB accesses the EPG system after being started, and acquires, from the EPG system, the channel list of the channel content.

Step 202: Receive, based on channel selection performed by a user according to the channel list, target channel content through a DVB network channel.

After an EPG system presents the channel list to the user, the user selects, according to the channel list, channel content that the user expects to watch. The hybrid STB receives, based on the channel selection performed by the user according to the channel list, the target channel content through the DVB network channel, where the target channel content is the channel content selected by the user.

It can be understood that in this step, the target channel content received by the hybrid STB through a DVB network is live broadcast of the target channel content.

Step 203: Acquire a first URL from the EPG system according to a rewind operation of the user.

The hybrid STB acquires, through the DVB network channel, channel content for live broadcast, where a current playing time point of the channel content acquired by the hybrid STB through the DVB network channel is a live broadcast moment. A rewind operation may be performed if the user needs to watch channel content that is on the target channel and whose moment is earlier than the live broadcast moment. In this case, the target channel content received by the hybrid STB through the DVB network cannot meet a rewind requirement of the user such that the hybrid STB is switched from the DVB network to an IP network to respond to the rewind operation of the user.

To acquire, through the IP network, the rewound target channel content, the hybrid STB first needs to locate a content fragment to which the target channel content has been rewound and that is saved in a CDN. The hybrid STB acquires, from the EPG system, the first URL, that is, a URL of the corresponding content fragment to which the target channel content has been rewound.

Further, after the user performs the rewind operation, the hybrid STB sends a rewind request to the EPG system according to a target channel time point to which the user rewinds, and the EPG system determines, according to the target channel time point to which the user needs to rewind, an identifier of a content fragment, which corresponds to the time point, of target channel content, and determines, according to the identifier of the content fragment, a URL of the content fragment.

The EPG system may acquire the first URL from a hybrid video system.

Step 204: Acquire, according to the first URL, the rewound target channel content from a CDN system located in an IP network.

After acquiring the first URL, the hybrid STB may locate the rewound target channel content. The hybrid STB acquires, according to the first URL, the rewound target channel content from the CDN system located in the IP network.

This embodiment provides, based on the hybrid network system shown in FIG. 1, a channel content playback method, where a hybrid STB accesses an EPG system, and acquires, from the EPG system, a channel list of channel content, receives, based on channel selection performed by a user according to the channel list, target channel content through a DVB network channel, acquires a first URL from the EPG system according to a rewind operation of the user, and acquires, according to the first URL, the rewound target channel content from a CDN system located in an IP network. Using such method, the hybrid STB provided in this embodiment of the present disclosure implements receiving, through the DVB network channel, target channel content for live broadcast, and acquiring the rewound target channel content from the CDN system located in the IP network. Because in this embodiment of the present disclosure, improvement is made based on an existing DVB network, and the DVB network is used to provide a live broadcast service of channel content for a user, idleness of the DVB network is not caused such that an operator may use the DVB network to provide a live broadcast service for the user, and use an IP network to provide a service based on the IP network for the user. Therefore, network resources are saved, transformation costs are reduced, and requirements of the operator are met.

Figure 3:
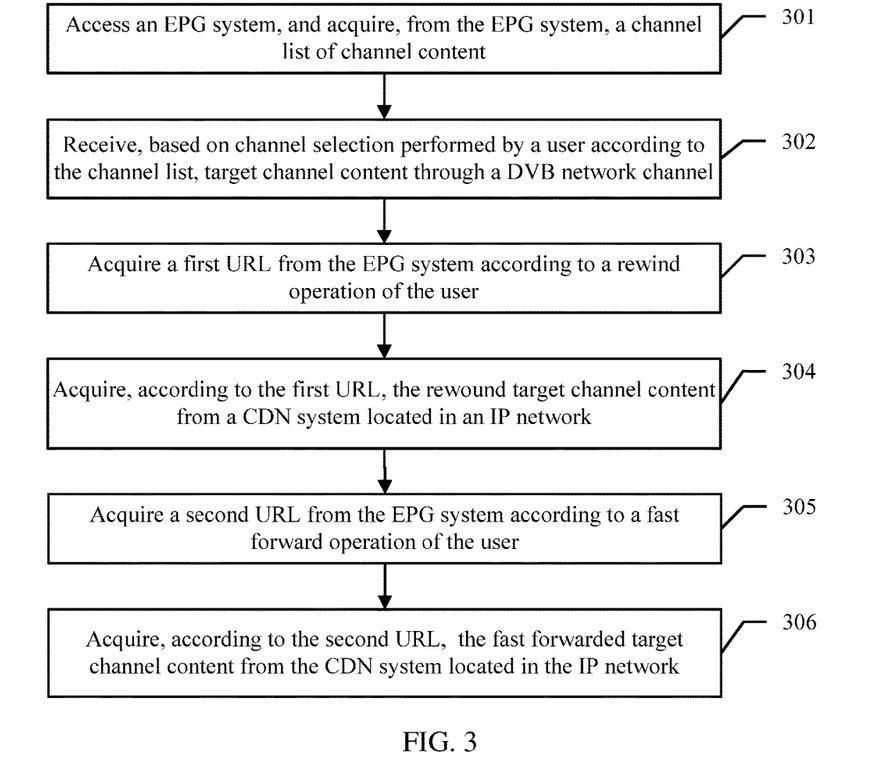
FIG. 3 is a flowchart of another embodiment of a channel content playback method in an embodiment of the present disclosure.

The embodiment shown in FIG. 2 provides a channel content playback method such that it is implemented that a hybrid STB receives, through a DVB network channel, target channel content for live broadcast, and acquires the rewound target channel content from a CDN system located in an IP network. The following embodiment provides, based on the hybrid network system shown in FIG. 1, another channel content playback method, which can implement acquisition of rewound target channel content, and can also implement acquisition of fast forwarded channel content. Referring to FIG. 3, a basic process of another embodiment according to the present disclosure includes the following steps.

Step 301: Access an EPG system, and acquire, from the EPG system, a channel list of channel content.

Step 302: Receive, based on channel selection performed by a user according to the channel list, target channel content through a DVB network channel.

Step 303: Acquire a first URL from the EPG system according to a rewind operation of the user.

Step 304: Acquire, according to the first URL, the rewound target channel content from a CDN system located in an IP network.

Step 301 to step 304 are same as step 201 to step 204, and details are not described herein again.

Step 305: Acquire a second URL from the EPG system according to a fast forward operation of the user.

If the user performs a fast forward operation after performing the rewind operation, to respond to the fast forward operation of the user, a hybrid STB first needs to locate a content fragment to which the target channel content has been fast forwarded and that is saved in a CDN. The hybrid STB acquires, from the EPG system, the second URL, that is, a URL of the corresponding content fragment to which the target channel content has been fast forwarded.

A method and a process for acquiring the second URL are consistent with a method and a process for acquiring the first URL.

The EPG system may acquire the second URL from a hybrid video system.

Step 306: Acquire, according to the second URL, the fast forwarded target channel content from the CDN system located in the IP network.

After acquiring the second URL, the hybrid STB may locate the fast forwarded target channel content. The hybrid STB acquires, according to the second URL, the fast forwarded target channel content from the CDN system located in the IP network.

It can be understood that the hybrid STB cannot be switched, in a case in which live broadcast of the target channel content is performed through the DVB network channel, to the IP network to respond to the fast forward operation of the user, and the hybrid STB can respond to the fast forward operation of the user only when the hybrid STB has been switched to the IP network and the rewind operation is performed.

This embodiment provides, based on the hybrid network system shown in FIG. 1, a channel content playback method, where a hybrid STB accesses an EPG system, and acquires, from the EPG system, a channel list of channel content, receives, based on channel selection performed by a user according to the channel list, target channel content through a DVB network channel, acquires a first URL from the EPG system according to a rewind operation of the user, acquires, according to the first URL, the rewound target channel content from a CDN system located in an IP network, acquires a second URL from the EPG system according to a fast forward operation of the user, and acquires, according to the second URL, the fast forwarded target channel content from the CDN system located in the IP network. Using such method, the hybrid STB provided in this embodiment of the present disclosure implements receiving, through the DVB network channel, target channel content for live broadcast, and acquiring the rewound or fast forwarded target channel content from the CDN system located in the IP network. Because in this embodiment of the present disclosure, improvement is made based on an existing DVB network, and the DVB network is used to provide a live broadcast service of channel content for a user, idleness of the DVB network is not caused such that an operator may use the DVB network to provide a live broadcast service for the user, and use an IP network to provide a service based on the IP network for the user. Therefore, network resources are saved, transformation costs are reduced, and requirements of the operator are met.

It can be understood that when the user performs the fast forward operation, a moment of the content fragment that is acquired by the hybrid STB from the CDN system and to which the target channel content has been fast forwarded is not later than that of a channel live broadcast moment of the target channel content. The hybrid STB switches from receiving the target channel content through a DVB network channel to receiving the target channel content through an IP network, that is, switches from fast forwarding of the target channel content to live broadcast of the target channel content when the moment to which the target channel content has been fast forwarded reaches the live broadcast moment of the target channel content.

The IP network includes an IP public network or an IP dedicated network. Preferably, if the IP network is an IP public network, when receiving, through the IP public network, the fast forwarded target channel content, the hybrid STB may acquire an index file of the content fragment corresponding to the target channel content such that the hybrid STB can determine whether the moment to which the target channel content has been fast forwarded reaches the live broadcast moment of the target channel content, and the CDN system determines whether the moment to which the target channel content has been fast forwarded reaches the live broadcast moment of the target channel content, and notifies the hybrid STB of a result of the determining if the IP network is an IP dedicated network.

For better understanding of the foregoing embodiment, the following provides description using a specific application scenario of the foregoing embodiment as an example.

A user intends to watch a television to watch NBA FINALS to be live broadcast on closed-circuit television (CCTV)-5 channel, so the user starts a hybrid STB, and the hybrid STB accesses an EPG system, acquires, from the EPG system, a channel list of channel content, and presents the channel list to the user.

The user selects the CCTV-5 channel according to the channel list, and the hybrid STB receives, through a DVB network, NBA FINALS that are being live broadcast on the CCTV-5 channel, and provides the received content for the user.

The user expects to review previous content of the game, so the user performs a rewind operation, that is, performs rewinding by 60 seconds (s) when advertising time begins after the first two quarters of the game end.

The hybrid STB receives the operation that is performed by the user for rewinding by 60 s, acquires, from the EPG system, a URL of a corresponding content fragment to which CCTV-5 channel content has been rewound by 60 s, and acquires, according to the URL and from a CDN system located in an IP network, the CCTV-5 channel content to which rewinding is performed by 60 s, and provides the content for the user.

After the user watches video content that the user expects to review, the user expects to enter live broadcast to wait for the third quarter of the game to start, so the user performs a fast forward operation, that is, performs fast forwarding by 50 s.

The hybrid STB receives the operation that is performed by the user for fast forwarding by 50 s, acquires, from the EPG system, a URL of a corresponding content fragment obtained when the CCTV-5 channel content has been rewound by 60 s and fast forwarded by 50 s, and acquires, according to the URL, the corresponding CCTV-5 channel content from the CDN system located in the IP network, and provides the content for the user.

The user finds that a moment of watched channel content is still earlier than a live broadcast moment of the channel content, so the user continues to perform a fast forward operation, that is, perform fast forwarding by 20 s.

Because the user performs an operation of rewinding by 60 s and an operation of fast forwarding by 50 s, a moment of the CCTV-5 channel content provided by the hybrid STB for the user is only 10 s earlier than the live broadcast moment of the channel content. Therefore, when the user performs fast forwarding by 20 s, the hybrid STB determines that a moment to which the CCTV-5 channel content has been fast forwarded has reached the live broadcast moment of the CCTV-5 channel, so the hybrid STB acquires the CCTV-5 channel content through the DVB network, and provides live broadcast of the CCTV-5 channel content for the user.

Figure 4:
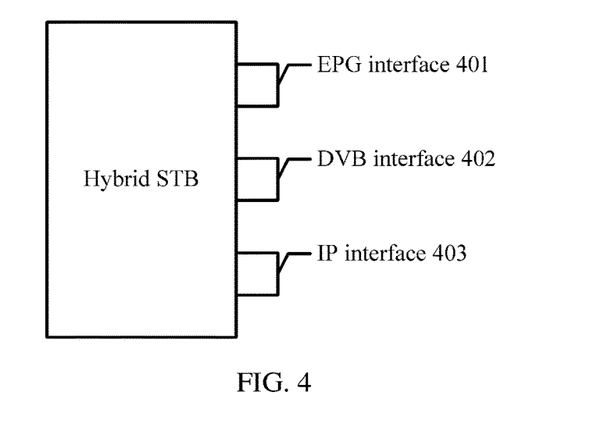
FIG. 4 is a structural diagram of an embodiment of a hybrid STB in an embodiment of the present disclosure.

An embodiment of the present disclosure further provides a hybrid STB supporting the foregoing hybrid network system and channel content playback method, for a basic structure of the hybrid STB, refer to FIG. 4. The hybrid STB mainly includes an EPG interface 401 configured to access an EPG system, and acquire, from the EPG system, a channel list of channel content, a DVB interface 402 configured to receive, based on channel selection performed by a user according to the channel list, target channel content through a DVB network channel, where the target channel content is channel content selected by the user, where the EPG interface 401 is further configured to acquire a first URL from the EPG system according to a rewind operation of the user, where the first URL is a URL of a corresponding content fragment to which the target channel content has been rewound, and an IP interface 403 configured to acquire, according to the first URL, the rewound target channel content from a CDN system located in an IP network.

The hybrid STB provided in this embodiment can implement the channel content playback method provided in the embodiments of the present disclosure. After being started, the EPG interface 401 of the hybrid STB accesses the EPG system, and acquires, from the EPG system, the channel list of the channel content. Then the hybrid STB acquires, through the DVB interface 402 and based on the channel selection performed by the user according to the channel list, channel content for live broadcast from a DVB network, and the EPG interface 401 of the hybrid STB acquires, from the EPG system, the first URL of a corresponding content fragment to which the channel content has been rewound when the user performs a rewind operation, and the IP interface 403 of the hybrid STB acquires, according to the acquired first URL, corresponding channel content from the CDN system.

The hybrid STB provided in this embodiment supports both a DVB network and an IP network. Channel content for live broadcast may be acquired through a DVB interface 402, and the fast forwarded or rewound channel content may also be acquired, based on the IP network, from a CDN through an IP interface 403. Live broadcast of the channel content can be performed through the DVB network, and a rewind operation can also be performed through the IP network. Because the hybrid STB in this embodiment uses a DVB network to provide a live broadcast service of channel content for a user, idleness of the DVB network is not caused such that an operator may use the DVB network to provide a live broadcast service for the user, and use an IP network to provide a service based on the IP network for the user. Therefore, network resources are saved, transformation costs are reduced, and requirements of the operator are met.

Preferably, to support a fast forward operation of the user, the EPG interface 401 is further configured to acquire a second URL from the EPG system according to the fast forward operation of the user, where the second URL is a URL of a corresponding content fragment to which the target channel content has been rewound, and the IP interface 403 is further configured to acquire, according to the second URL, the fast forwarded target channel content from the CDN system located in the IP network.

Preferably, the DVB interface 402 is further configured to receive the target channel content through the DVB network channel when a moment to which the target channel content has been fast forwarded reaches a live broadcast moment of the target channel content.

For better understanding of the foregoing embodiment, the following provides description using a specific application scenario of the foregoing embodiment as an example.

A user intends to watch a television to watch NBA FINALS to be live broadcast on CCTV-5, so the user starts a hybrid STB, and the hybrid STB accesses an EPG system through the EPG interface 401, acquires, from the EPG system, a channel list of channel content, and presents the channel list to the user.

The user selects a CCTV-5 channel according to the channel list, and the hybrid STB receives, through the DVB interface 402 and through a DVB network, NBA FINALS that are being live broadcast on the CCTV-5 channel, and provides the received content for the user.

The user expects to review previous content of the game when advertising time begins after the first two quarters of the game end, so the user performs a rewind operation, that is, performs rewinding by 60 s.

The hybrid STB receives the operation that is performed by the user for rewinding by 60 s, acquires, from the EPG system, a URL of a corresponding content fragment to which CCTV-5 channel content has been rewound by 60 s, and acquires, through the IP interface 403 according to the URL and from a CDN system located in an IP network, the CCTV-5 channel content to which rewinding is performed by 60 s, and provides the content for the user.

After the user watches video content that the user expects to review, the user expects to enter live broadcast to wait for the third quarter of the game to start, so the user performs a fast forward operation, that is, performs fast forwarding by 50 s.

The hybrid STB receives the operation that is performed by the user for fast forwarding by 50 s, acquires, from the EPG system, a URL of a corresponding content fragment obtained when the CCTV-5 channel content has been rewound by 60 s and fast forwarded by 50 s, and acquires, through the IP interface 403 according to the URL, the corresponding CCTV-5 channel content from the CDN system located in the IP network, and provides the content for the user.

The user finds that a moment of watched channel content is still earlier than a live broadcast moment of the channel content, so the user continues to perform a fast forward operation, that is, perform fast forwarding by 20 s.

Because the user performs an operation of rewinding by 60 s and an operation of fast forwarding by 50 s, a moment of the CCTV-5 channel content provided by the hybrid STB for the user is only 10 s earlier than the live broadcast moment of the channel content. Therefore, the hybrid STB determines that a moment to which the CCTV-5 channel content has been fast forwarded has reached the live broadcast moment of the CCTV-5 channel when the user performs fast forwarding by 20 s, so the hybrid STB acquires the CCTV-5 channel content through the DVB interface 402 and through the DVB network, and provides live broadcast of the CCTV-5 channel content for the user.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A hybrid network system, comprising:
   a head end system configured to:
      acquire channel content from a media source;
      perform encoding on the channel content;
      provide live broadcast of the channel content for a terminal through a digital video broadcasting (DVB) network; and
      send the channel content to the hybrid video system that is in an Internet Protocol (IP) network;
   a hybrid video system coupled to the head end system and configured to:
      acquire the channel content from the head end system;
      perform editing on the channel content;
      generate a channel list of the channel content; and
      deliver the channel content to a content delivery network (CDN) system;
   the CDN system coupled to the hybrid video system and configured to:
      acquire the channel content from the hybrid video system;
      allocate a uniform resource locator (URL) to the channel content;
      report the URL to the hybrid video system; and
      provide on-demand broadcast of the channel content for a hybrid set top box, according to a request from a user submitted via the URL and for performing rewinding or fast forwarding of the channel content to obtain rewound or fast forwarded content of the channel content;
   an electronic program guide (EPG) system coupled to the CDN system and configured to:
      acquire the channel list of the channel content and the URL of the channel content from the hybrid video system; and
      send the channel list and the URL of the channel content to the hybrid set top box according to the request of the user; and
   the hybrid set top box coupled to the EPG system, the CDN system, and the head end system, and configured to:
      acquire the channel list from the EPG system;
      acquire, based on a DVB network channel, the channel content from the head end system through a DVB interface according to channel selection performed by the user based on the channel list;
      acquire the URL of the channel content from the EPG system; and subsequent to receiving the channel content from the head end system through the DVB interface, switch, based on the rewind or fast forward request of the user, to acquiring the rewound or fast forwarded content of the channel content from the CDN via the IP network through an IP interface according to the URL.

2. A channel content playback method, comprising:

accessing an electronic program guide (EPG) system;

acquiring, from the EPG system, a channel list of channel content;

acquiring, through a digital video broadcasting (DVB) network channel and based on channel selection performed by a user according to the channel list, a target channel content selected by the user; and responsive to a rewind operation of the user:
  acquiring a first uniform resource locator (URL) from the EPG system according to the rewind operation of the user, the first URL being a URL of a corresponding content fragment to which the target channel content has been rewound; and
  switching from acquiring the target channel content from the DVB network to acquiring, according to the first URL, rewound channel content of the target channel content from a content delivery network (CDN) system located in an Internet Protocol (IP) network.

3. The channel content playback method of claim 2, further comprising:
  acquiring a second URL from the EPG system according to a fast forward operation of the user, the second URL being a URL of a corresponding content fragment to which the target channel content has been fast forwarded; and
  acquiring, according to the second URL, the fast forwarded target channel content from the CDN system located in the IP network.

4. The channel content playback method of claim 3, further comprising receiving the target channel content through the DVB network channel when a moment to which the target channel content has been fast forwarded reaches a live broadcast moment of the target channel content.

5. A hybrid set top box, comprising:
an electronic program guide (EPG) interface configured to:
  access an EPG system; and
  acquire, from the EPG system, a channel list of channel content;
a digital video broadcasting (DVB) interface coupled to the EPG interface configured to:
  acquire, through a DVB network channel and based on channel selection performed by a user according to the channel list, a target channel content selected by the user; and
  acquire a first uniform resource locator (URL) from the EPG system according to a rewind operation of the user, the first URL being a URL of a corresponding content fragment to which the target channel content has been rewound; and
an Internet Protocol (IP) interface coupled to the EPG interface and the DVB interface, the hybrid set top box configured to switch, based on receiving the rewind operation of the user, from acquiring the channel content from the DVB network channel to acquiring, according to the first URL and via an Internet Protocol (IP) network through the IP interface, rewound channel content of the target channel content from a content delivery network (CDN) system located in the IP network.

6. The hybrid set top box of claim 5, wherein the EPG interface is further configured to acquire a second URL from the EPG system according to a fast forward operation of the user, the second URL being a URL of the corresponding content fragment to which the target channel content has been fast forwarded, and the IP interface being further configured to acquire, according to the second URL, the fast forwarded target channel content from the CDN system located in the IP network.

7. The hybrid set top box of claim 6, wherein the DVB interface is further configured to receive the target channel content through the DVB network channel when a moment to which the target channel content has been fast forwarded reaches a live broadcast moment of the target channel content.

* * * * *